United States Patent [19]

Hopkins

[11] 4,223,779
[45] Sep. 23, 1980

[54] AUTOMATIC TRANSFER MECHANISM

[75] Inventor: Ronald C. Hopkins, Amsterdam, N.Y.

[73] Assignee: Life Savers, Inc., New York, N.Y.

[21] Appl. No.: 725,202

[22] Filed: Sep. 22, 1976

[51] Int. Cl.³ .............................................. B65G 47/26
[52] U.S. Cl. ..................................... 198/426; 198/482
[58] Field of Search .......................... 198/408, 411–413, 198/426, 427, 429, 430, 458, 457, 482–484, 655, 656, 725, 728, 735

[56] References Cited

U.S. PATENT DOCUMENTS

| 2,082,352 | 6/1937 | Neumair | 198/484 |
| 3,136,320 | 6/1964 | Molins et al. | 198/430 |
| 3,670,866 | 6/1972 | Olivotto | 198/412 |

FOREIGN PATENT DOCUMENTS

| 2227199 | 11/1974 | France | 198/482 |
| 300689 | 9/1932 | Italy | 198/430 |

Primary Examiner—Joseph E. Valenza

Attorney, Agent, or Firm—Lawrence S. Levinson; John J. Archer

[57] ABSTRACT

An automatic transfer mechanism is provided which is particularly useful in automatically collecting, indexing, orienting and transferring individual uniform-sized pieces, such as pieces of chewing gum or candy in the form of blocks from a single piece wrapping machine to a package overwrap machine. The mechanism includes transfer pocket indexing means having a plurality of pockets for automatically receiving, indexing and orienting individual pieces, means for automatically loading individual pieces into the pockets while the pockets are disposed at a first position, drive means for moving the pockets first vertically and then horizontally to a second position where the individual pieces contained therein are indexed to an attitude 90° from their attitude in the original first position, and further including means for removing the pieces from the pockets while maintaining their orientation and conveying them to a package overwrap machine.

3 Claims, 4 Drawing Figures

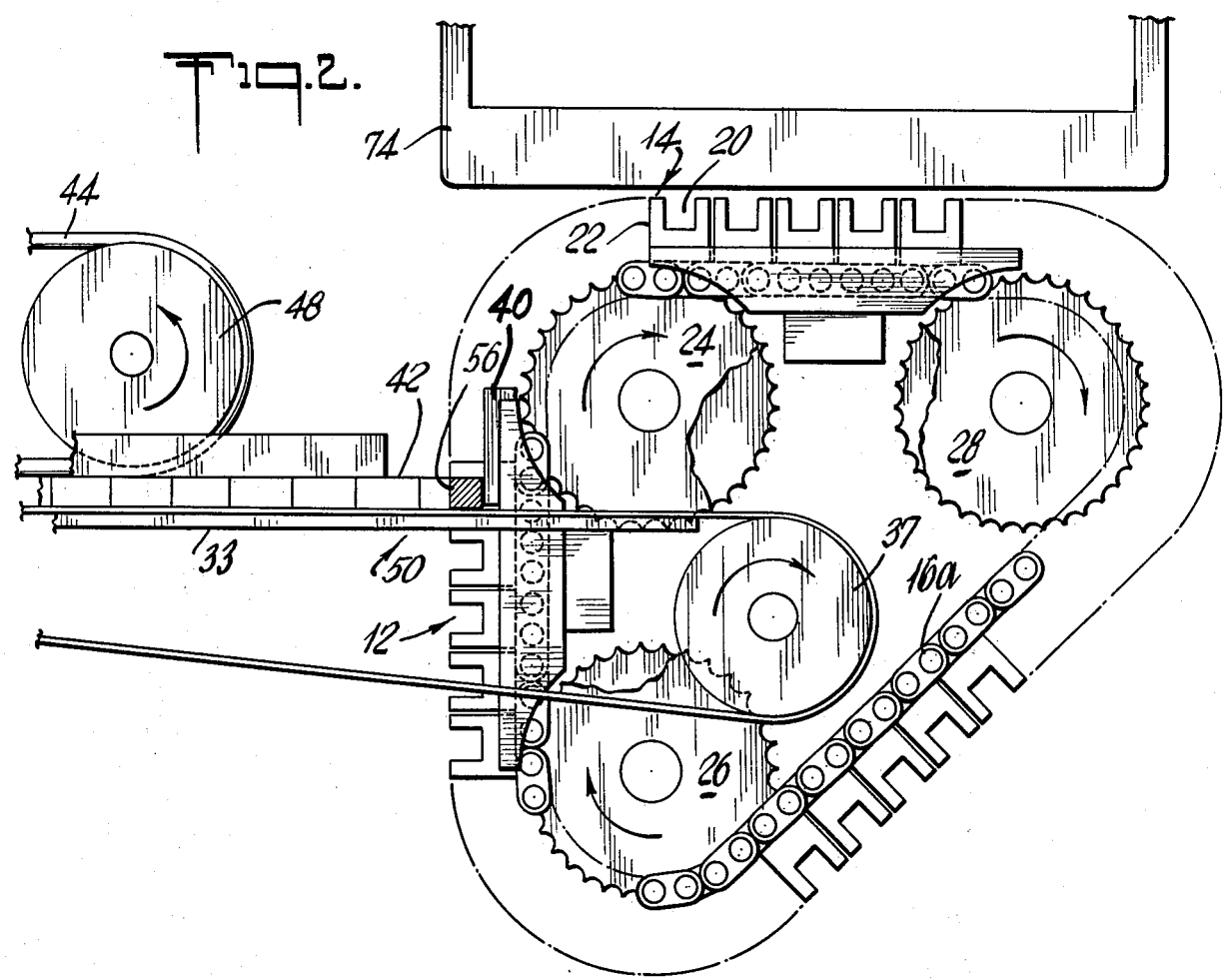
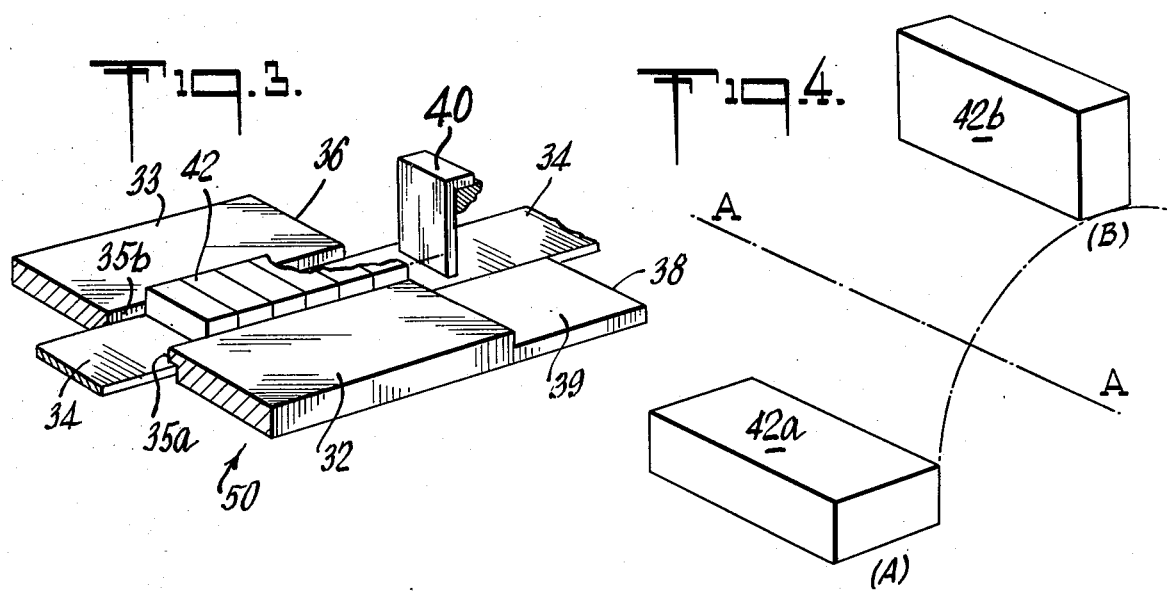

AUTOMATIC TRANSFER MECHANISM

FIELD OF THE INVENTION

The present invention relates to an automatic transfer mechanism which collects, indexes, orients and transfers individual pieces, such as pieces of chewing gum or candy, from one place to another, for example, from a single piece wrapping machine to a package overwrap machine.

BACKGROUND OF THE INVENTION

The manufacturing and packaging of chewing gum in block form, such as bubble gum, usually is a semi-automated operation wherein loaves of finished gum are passed through an extruder and formed into long ropes of gum. The ropes are then fed to a cut and wrap machine where the ropes are formed into rectangular cross section and cut into individual blocks of gum after which each of the individual blocks is wrapped. The wrapped blocks are manually placed in trays and transferred to a manual magazine feed overwrapping machine where a set number of individually wrapped blocks are grouped and overwrapped to provide a finished wrapped package of gum. Unfortunately, it has been found that this procedure, especially the packaging phase, requires excessive direct labor and space and therefore is economically unsatisfactory for an overall gum making and packaging operation.

BRIEF STATEMENT OF THE INVENTION

In accordance with the present invention, an automatic transfer mechanism is provided which automatically collects uniformly sized individual pieces, such as pieces of wrapped chewing gum in the form of blocks or other regular solid shapes from a single piece wrapping machine, automatically indexes and orients these individually wrapped pieces, and automatically transfers the oriented, individually wrapped pieces to a package overwrap machine. The automatic transfer mechanism of the invention includes transfer pocket indexing means which is in the form of a plurality of pockets for automatically collecting, indexing and orienting pieces, such as pieces of bubble gum or candy, load means for automatically loading individual pieces into the pockets at a first position, drive means for moving the pockets with the individual pieces contained therein to a second position in which the individual pieces are indexed 90° with respect to their original position, and means for automatically removing the indexed individual pieces from the transfer pockets so that the pieces are oriented and ready for transfer to a package overwrap machine. Such a transfer can be effected by an associated channeling guide means for receiving a predetermined number of oriented pieces from the transfer pockets and grouping the oriented pieces for movement by a conveyor means to an overwrap packaging machine.

As explained in the detailed description which follows, operation of the automatic transfer mechanism of this invention, and more specifically the movement of the transfer pockets, loading means, and means for removing the individual pieces from the transfer pockets and into channeling guide means, is synchronized to provide high speed operation of the automatic transfer mechanism of the invention.

BRIEF DESCRIPTION OF THE FIGURES

FIG. 2 is a schematic side view of the transfer pocket mechanism portion of the mechanism shown in FIG. 1 and illustrates drive components for the transfer pocket mechanism;

FIG. 3 is a perspective view of the transfer pocket loading station shown in FIGS. 1 and 2; and FIG. 4 is a perspective view of an individual piece of gum in a first position (A) and an individual piece of gum in a second, indexed position (B) to illustrate the indexing accomplished by the transfer pocket mechanism.

DETAILED DESCRIPTION

Figure 1:
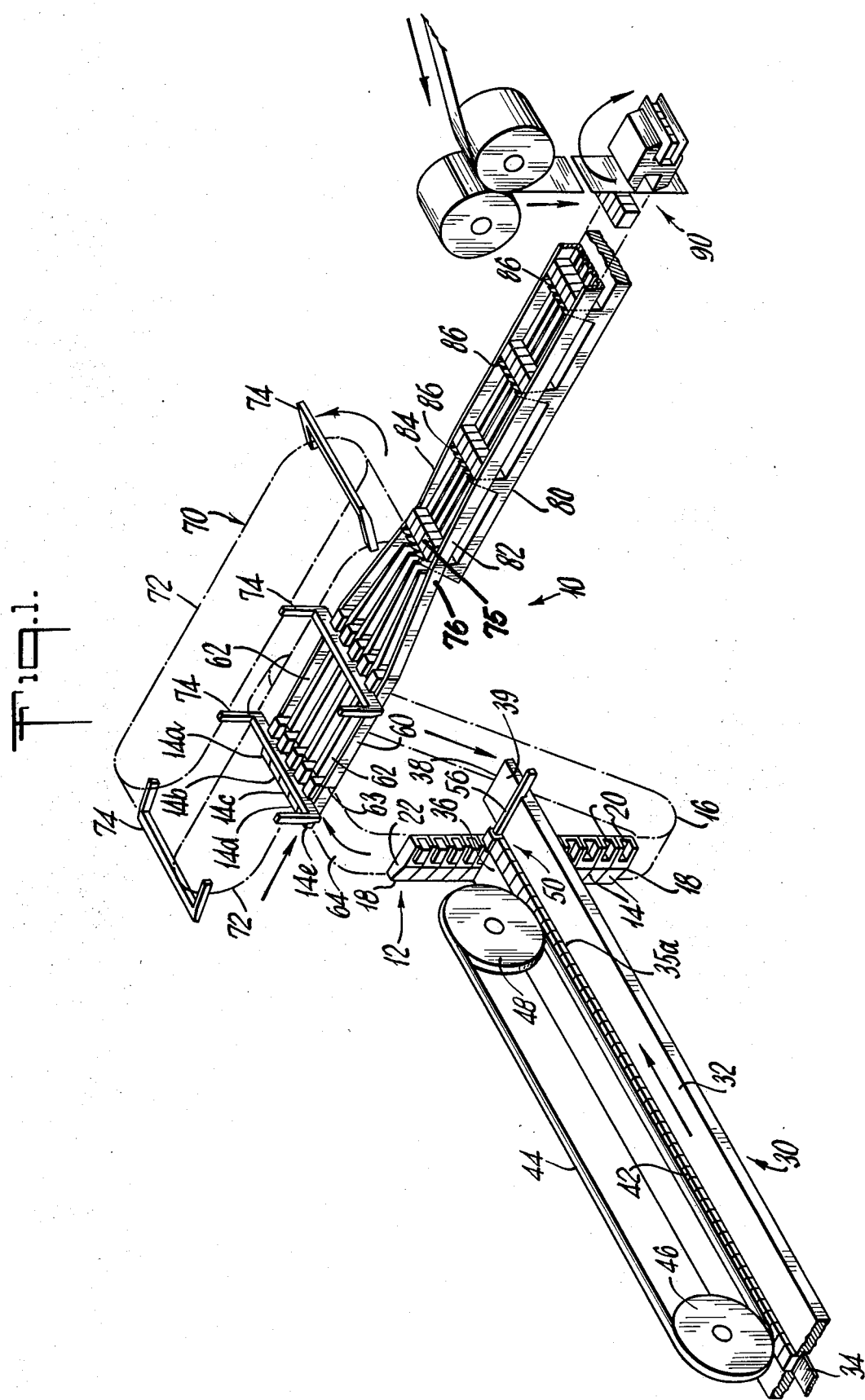
FIG. 1 is a schematic perspective view of the automatic transfer mechanism of the invention.

With reference to the accompanying drawings, identical parts are identified by the same reference numerals in the four figures.

FIG. 1 illustrates the automatic transfer mechanism of the present invention which is indicated generally by reference numeral 10. This automatic transfer mechanism 10 includes a transfer pocket mechanism indicated generally by reference numeral 12 for indexing the individual pieces to be overwrapped.

As shown in FIGS. 1 and 2, transfer pocket mechanism 12 includes a plurality of collecting and indexing pockets 14 carried on an endless conveyor 16, which advantageously is provided as a pair of endless chains, one of which is shown in FIG. 2 as 16a. FIG. 2 also shows the drive means for the conveyor 16 as sprockets 24, 26 and 28 which drive the endless chain 16a. A second set of three sprockets (not shown) coupled to sprockets 24, 26 and 28 are provided to drive the second endless chain (not shown). While a single endless chain would serve as the conveyor 16 for the pockets 14, the use of a two chain conveyor 16, with each pocket 14 fastened to both chains, is advantageous because it prevents any swivel movement of individual pockets 14. For the sake of drawing clarity, the pockets 14 are shown only on a portion of the conveyor 16, it being understood however that pockets 14 are disposed along the entire length of the conveyor 16.

Each of the pockets 14 includes a pocket body 18 connected to the conveyor 16, i.e., connected to both endless chain 16a and its companion endless chain (not shown) when the conveyor 16 takes the form of a pair of endless chains. The pocket body 18 comprises pocket body sides 22 and an individual piece pocket 20 for receiving an individual piece, such as a piece of bubble gum or candy. In the preferred embodiment shown, the sides 22 of each of the pocket bodies 18 are parallel with each other, with the sides 22 of the adjacent pocket bodies 18, and with the parallel interior side walls of the individual piece pockets 20. The pocket bodies 18 are aligned on and fastened to the conveyor 16 so that each individual piece pocket 20 may be loaded with an individual piece to be indexed at a single loading station, indicated generally by the reference numeral 50, in a manner to be described in detail hereinafter.

The conveyor 16 is driven in a clockwise direction by pocket conveyor drive means shown in FIG. 2 in the form of sprockets 24, 26 and 28, which as stated previously will have a companion set of three sprockets coupled thereto when two endless chains are used as conveyor 16. The sprockets are driven by a main drive which may be supplied by any source of power, e.g., a conventional electric motor, and the sprockets are synchronized with other elements of the automatic transfer mechanism 10 by means and in a manner which will be described in detail hereinafter.

The means for feeding an individual piece into a pocket 14 of the transfer pocket mechanism 12 comprises a feed conveyor indicated generally by reference numeral 30 and a loading station indicated generally by the reference numeral 50. As shown most completely in FIG. 1, the feed conveyor 30 includes product side guides 32 and 33 which are positioned just above and to either side of the center line of conveyor belt 34 which delivers the individual pieces to the loading station 50. Interior side walls 35a and 35b of side guides 32 and 33 are spaced apart a distance just sufficiently greater than the transverse dimension of the individual pieces to be passing therebetween so that the side guides 32 and 33 will not impede the flow of individual pieces while controlling the direction of movement and orientation of the individual pieces. The conveyor belt 34 is driven by the drive pulley 37 which is powered by a separate, variable speed motor so that the speed of the belt 34 may be adjusted. The tail pulley for belt 34 is not shown in the drawings. In order to provide sufficient pressure of the individual pieces 42 on the conveyor belt 34 to assure their travel with the belt 34 as well as additional force in the direction of travel to assure a constant supply of individual pieces 42 at the loading station 50, there is provided in the preferred embodiment the overhead endless friction drive belt 44 operated by drive pulley 48 and tail pulley 46. The belt 44 may be nylon and round in cross section and may be driven by a separate variable speed motor so that the belts 34 and 44 may be adjusted to the same speed. The individual pieces 42 are disposed on belt 34 with the upper face 42a and the lower face 42b being horizontally oriented (as shown in FIG. 4A). The upper face 42a is above the level of the upper surfaces of side guides 32 and 33.

At the delivery end of the conveyor belt 34, the side guide 33 terminates at 36 to permit the upward passage of the transfer pocket 14 and the side guide 32 extends beyond the end 36 of side guide 33 to 38. However, this extra length 39 of side guide 32 is recessed (as best shown in FIG. 3) to provide the loading station 50 for the transfer pockets 14. The side guide 32 is recessed for the portion 39 to the level of the lower face 42b of each individual piece 42, i.e., to the level of the upper surface of the belt 34. This recess permits the passage thereover of a ram or pusher bar 56 which is slightly smaller in cross-section than an individual piece 42 and therefore which can contact the exposed side of an individual piece 42 and push it into a pocket 20 aligned with the loading station 50. The bar 56 is smaller in cross-section than the pocket 20 and therefore the far end of its stroke may be slightly within a pocket 20 instead of just flush with the pocket 20 entrance. When fully withdrawn, bar 56 must be completely out of the path of the individual pieces 42 on conveyor belt 34 so that the next individual piece 42 can align itself on the loading station 50 with the next pocket 20. The ram or pusher bar 56 is connected to drive means (not shown) which converts rotary motion into the reciprocating motion required for the pusher bar 56 and is synchronized with other elements of the automatic transfer mechanism 10 by means and in a manner which will be described in detail hereinafter.

As the pockets 20 are successively loaded with individual pieces 42 at the loading station 50, the indexing pockets 14 are transported by conveyor 16 from the loading station 50 to the entrance 63 of the channeling guide 60. That is, the conveyor 16 has moved from a vertical attitude to a horizontal attitude at point 64 and in so doing has indexed the individual pieces 42 carried in the indexing pockets 14.

When the indexing pockets 14a through 14e are in register with the five channels of channeling guide 60, a feed bar 74 which is carried on the pair of endless chain conveyors 72 removes the individual pieces 42 from the indexing pockets 14a through 14e and pushes them into the five channels of the channeling guide 60, through the channeling guide 60 where they are moved together into a single pack and then discharges from the channeling guide 60 the unit of five individual pieces 42 for transport to the overwrap machine 90 by means of the transport mechanism shown in FIG. 1 as a finger transport mechanism 80, although many transport mechanisms would be suitable for this purpose of retaining the unit of five individual pieces 42 firmly together until introduced into the package overwrap machine 90. The finger transport mechanism 80 retains the unit of five individual pieces 42 together by accurately spaced side guides 82 and 84 while the fingers 86 push the unit along the transport mechanism 80 through a series of stations, the number of which is determined by the length of each stroke in the direction of the overwrap machine 90 of the square motion mechanism driven by an eccentric and a cam lifter mechanism (not shown).

In the overwrapping of multiple pieces of wrapped bubble gum to prepare a final package for market, the automatic transfer mechanism 10 of the present invention is coupled to a single piece cut and wrap machine (not shown) from which individually wrapped pieces 42 are discharged and accumulated on conveyor belt 34 of conveyor feed assembly 30 with all pieces 42 having the same orientation. The pieces 42 travel toward the transfer pocket mechanism 12 on the belt 34 between guides 32 and 33 as described previously. When an individual piece 42 contacts the overhead stop 40 which is fastened to and depends from the supporting structure of the transfer pocket mechanism 12 as shown in FIG. 2, it is on the loading station 50 and aligned with a pocket 20 of one of the indexing pockets 14 so that this individual piece 42 can be transferred laterally from the conveyor belt 34 into a pocket 20 of the transfer pocket mechanism 12 by the loading ram or pusher bar 56. The piece 42 is then indexed vertically and horizontally so that it is positioned 90° from its original position on the conveyor belt 34. That is, the individual piece 42 has been moved from an attitude as shown in FIG. 4A to an attitude shown in FIG. 4B.

In the embodiment of the invention shown in the drawings, five individual pieces 42 are overwrapped into a package. The present invention can be used to overwrap more or fewer pieces, as desired, with the maximum number being limited by practical considerations. In the present embodiment, when five pieces have been indexed as described above, they will be in line with the channeling guide 60 and will be pushed at right angles to the direction of travel of the indexing pockets 14 into the individual channels 62 by a feed bar 74 carried by roller chains 72 of continuous motion overhead feed bar roller chain mechanism 70 driven by sprockets (not shown). The feed bar 74 carries the group of five individual pieces 42 through the channeling guide 60 where the five individual pieces 42 are brought together into a unit 75 as they are discharged from the narrow end 76 of the channeling guide 60 for transport to the overwrap machine 90.

The channeling guide 60 is advantageously prepared from a single piece of solid aluminum by milling channels 62 therein and coating the surface of the channels 62 with a material such as "Tefloc" to provide desirable slip and wear characteristics.

In order to synchronize the movements of those elements of the automatic transfer mechanism 10 which cooperate in timed relation to each other, i.e., the loading ram or pusher bar 56, the transfer pocket mechanism 12, and the continuous motion overhead feed bar roller chain mechanism 70, such elements must be driven directly or indirectly from the same drive shaft so that synchronization can be based on a common rotation. In the present invention, the main drive shaft (not shown) of the automatic transfer mechanism 10 drives all three of the elements named above. The feed bar mechanism 70 is directly coupled to the main drive shaft and is in continuous motion with the feed bars 74 spaced along the roller chains 72 at a distance one from the other as defined below. The pusher bar 56 is connected to the main drive shaft through an eccentric (not shown) and linkage (not shown) between the pusher bar 56 and the eccentric so that the rotary motion is converted to simple reciprocating motion. The transfer pocket mechanism 12 is connected to the main drive shaft through an indexing drive, such as the Ferguson Indexing Drive, which provides an intermittent motion to the conveyor 16 and the transfer pockets 14 carried thereon. As the result of such connections to a common drive, i.e., the main drive shaft, these three elements can be adjusted to provide synchronization of their movements in the following manner.

For each complete revolution of the eccentric, the pusher bar 56 is moved through a full stroke, e.g., from the start of the loading of an individual piece 42 into a pocket 20 of an indexing pocket 14 to the start of the loading of the next piece. For something less than 180° of a full revolution of the eccentric, the pusher bar 56 is loading an individual piece 42 into a pocket 20, and therefore, the conveyor 16 carrying the indexing pockets 14 must be motionless. A 180° dwell of the conveyor 16 is provided by the indexing drive connecting the conveyor 16 of the transfer pocket mechanism 12 to the main drive shaft. By the selection of the eccentric, the duration of the loading operation by the pusher bar 56 may be adjusted, i.e., shortened, so that there is a greater degree of tolerance whereby synchronization between the pusher bar 56 and the conveyor 16 is not so critical. By an appropriate selection of indexing drive and driving sprockets the movement of the conveyor 16 between each 180° dwell can be set at the width of a transfer pocket 14 pocket body 18. Consequently, when adjustment is made to place a transfer pocket 14 in alignment with the pusher bar 56 station 50 during a dwell, then at each dwell a transfer pocket 14 will have been moved into place by the motion of the conveyor 16 between dwells. By the proper positioning of the channeling guide 60, and because the center-to-center distance between channels 62 is equal to the width of a pocket body 18, as a transfer pocket 14 is aligned at loading station 50 between dwells of the conveyor 16, a transfer pocket 14 will be aligned with each of the channels 62. By an appropriate selection of drive and driving sprockets, the travel of the feed bar roller chains 72 can be set and thereby determine the proper distance between feed bars 74 on the roller chains 72 so that, after the passage of one feed bar 74 to remove five individual pieces 42 into the channeling guide 60 at a dwell of the conveyor 16, there will be five movements and five dwells of the conveyor 16 before the next feed bar 74 performs the same function.

As explained above, by appropriate selection of parts and proper adjustments, the pusher bar 56, the transfer pocket mechanism 12, and the feed bar mechanism 70 can be synchronized because they have a common drive means.

Although the apparatus of the invention has been described at times in terms of collecting, indexing, orienting and transferring individual pieces of chewing gum or candy, it will be understood that any type of material in the form of individual pieces of uniform size may be handled by the apparatus of the present invention.

What is claimed is:

1. An automatic transfer mechanism comprising transfer pocket indexing means comprising a plurality of pockets for collecting and indexing individual pieces of uniform size and pocket conveyor means to which said pockets are affixed, said pocket conveyor means being in the form of an endless chain, loading means comprising a reciprocating pusher bar actuated by an eccentric connected to a main drive means for automatically loading individual pieces into said pockets at a first position, pocket driving means which is in the form of a driven sprocket for moving said pocket conveyor means and said affixed pockets and the individual pieces contained therein to a second, indexed position 90° from their original first position about that axis of each piece which is transverse to direction of movement and parallel to plane of movement, said pocket driving means being connected to said main drive means through an indexing drive providing a 180° dwell of said pocket driving means, and means for automatically removing the so-indexed and so-positioned pieces from said pockets in a manner such that the individual pieces are maintained in their indexed position, said removing means comprising feed bars carried on an endless chain driven by a sprocket connected to said main drive means, and said pocket indexing means being synchronized with said loading means and said removing means.

2. The mechanism of claim 1 in combination with a conveyor means to supply individual pieces and a channel guide means to receive the pieces removed from said pockets, said channel guide means adapted to maintain said pieces in their indexed position.

3. The apparatus of claim 2 in combination with transport means connecting said channel guide means with an overwrap packaging machine.

* * * * *